US006953149B2

(12) United States Patent
Taylor

(10) Patent No.: US 6,953,149 B2
(45) Date of Patent: Oct. 11, 2005

(54) SECURE DROP BOX

(76) Inventor: Gary L. Taylor, 715 S. Upas, Escondido, CA (US) 92925

( * ) Notice: Subject to any disclaimer, the term of this patent is extended or adjusted under 35 U.S.C. 154(b) by 104 days.

(21) Appl. No.: 10/608,983

(22) Filed: Jun. 26, 2003

(65) Prior Publication Data

US 2005/0006451 A1 Jan. 13, 2005

(51) Int. Cl.[7] .................................... B65G 11/04
(52) U.S. Cl. .................... 232/45; 70/56; 70/417; 70/DIG. 43; 70/DIG. 56
(58) Field of Search ..................... 232/45, 47, 17; 70/54–56, 417, DIG. 43, DIG. 56, 40, 48

(56) References Cited

U.S. PATENT DOCUMENTS

| | | | | | |
|---|---|---|---|---|---|
| 168,566 | A | * | 10/1875 | Hilton | 70/54 |
| 547,550 | A | * | 10/1895 | Hopkins | 70/56 |
| 626,266 | A | * | 6/1899 | Bomberger | 70/56 |
| 1,055,865 | A | * | 3/1913 | Boll | 70/56 |
| 3,727,438 | A | * | 4/1973 | Knaack | 70/63 |
| 3,880,344 | A | * | 4/1975 | Earle | 232/17 |
| 4,993,626 | A | * | 2/1991 | Berry | 232/17 |
| 5,003,795 | A | * | 4/1991 | Hoke | 70/55 |
| 5,172,574 | A | * | 12/1992 | Perfetto | 70/56 |
| D423,907 | S | | 5/2000 | Fiegener | |
| 6,234,388 | B1 | | 5/2001 | Taylor | |
| 6,305,198 | B1 | * | 10/2001 | Chastain et al. | 70/40 |
| 6,463,769 | B1 | * | 10/2002 | Garner | 70/56 |
| 6,722,561 | B1 | * | 4/2004 | Thomas et al. | 232/39 |

* cited by examiner

*Primary Examiner*—William L. Miller
(74) *Attorney, Agent, or Firm*—Mary Jo Redman; Calif Tervo

(57) ABSTRACT

Secure enclosure (10) is useful as mailbox or police evidence dropbox. Items are deposited through unsecured portal (32), pass past baffle (90) and are stored in secure compartment (40). Access to secure compartment (40) is through door (46). Lock lock housing (60) is mounted rigidly on door (46) and holds rotary shackle padlock (70) such that rotary shackle (73) engages hasp (51) to lock door (46) but rotary shackle padlock (70) is protected against twisting, prying, or impact.

17 Claims, 2 Drawing Sheets

SECURE DROP BOX

FIELD OF THE INVENTION

This invention relates generally to secure dropboxes, and more particularly to a mailbox that is highly resistant to vandalism and robbery.

BACKGROUND OF THE INVENTION

Valuable goods and documents are often left unattended in mailboxes, especially in rural or suburban areas where mail is not deposited directly into a home door slot. A vandal may damage many mailboxes in a single night, causing the contents to be scattered and damaged. Thieves open and remove the contents of mailboxes to obtain checks, personal information, prescription drugs, and other valuables.

Some vandalism is prevented simply by constructing mailboxes of stronger or more resilient materials. To protect the contents, some mailboxes have a lock, to which both the owner and the postman have keys. These locks are typically simple "cabinet" locks with a finger that rotates 90° between locked and unlocked positions. Such locks are a deterrent to casual snoops, but are easily forced open by thieves. Also, the keys are simple and can be easily duplicated and the mailbox owner does not have exclusive possession of the key.

Reinforced mailboxes are available that have a convenient unlocked entrance for use by the postman and a locking access door, with some type of baffle between. The locking door may have a hasp for a padlock or a built-in "cylinder" lock. With such a dual-access mailbox, the owner of the mailbox has the only keys and the postman is not inconvenienced by having to unlock and lock the mailbox when delivering mail. The baffle prevents thieves from retrieving items out of the mailbox by inserting an arm or tool through the unlocked entrance.

Such a mailbox deters thieves greatly, but is still vulnerable. Most padlocks can be cut, given a strong enough tool, and cylinder locks can generally be opened by a very strong blow to the front of the cylinder. Tools are available that allow thieves to punch out a cylinder lock from a reinforced mailbox and remove the contents in only a couple of minutes. Therefore, there is a need for a reinforced mailbox that requires sufficient time, skill, and tools to open it that experienced thieves pass it by in favor of one easier to open.

Also, padlocks are somewhat inconvenient to use. In the case of a keyed padlock, the keyway is at the bottom and the body of the padlock must move approximately an inch vertically relative to the hasp and be rotated in order to open. Unlocking or locking such a padlock requires the use of two hands, one for the key and the other to manipulate the padlock. If one is holding items, such as the retrieved mail, the items must be put down to leave both hands free to operate the padlock. Thus, there is a need for a reinforced mailbox that is convenient to unlock and lock, even while holding an item.

There is further a need for secure enclosures for uses other than receiving mail. For example, law enforcement personnel often confiscate or otherwise receive items in evidence that must be maintained securely. They may have to interrupt their duties and travel a long distance to take a gull, a packet of cash, illegal drugs, or other items to a central location for deposit into evidence storage. There is a need for a secure dropbox for uses such as law enforcement evidence deposit. Such a dropbox must be convenient for the depositor to use, yet very secure to maintain a proper chain of custody.

SUMMARY OF THE INVENTION

This invention is a secure enclosure that is adapted for use as a mailbox for home or business, evidence dropbox for law enforcement agencies, or key dropbox for an auto repair shop or rental agency.

Items such as mail or keys are deposited conveniently through an unlocked portal.

The secure enclosure includes a secure compartment that is accessible through a locking door. A baffle between the unlocked portal and the secure compartment makes it impossible to remove items from the secure compartment by inserting an arm or elongate tool through the unlocked portal.

On the door is mounted a lock lock housing of stainless steel. A rotary shackle padlock is held snugly by the bottom and wrap-around sides of the lock housing Such that the rotary shackle can engage a hasp to lock the door, yet the rotary shackle padlock cannot be twisted, pried, or jerked so as to break the rotary shackle or the hasp. When locked to the hasp, the rotary shackle padlock cannot be removed from the housing.

The lock lock housing and door of the enclosure reinforce the body of rotary shackle padlock such that the mechanism of rotary shackle padlock cannot be punched out using an impact tool. The rotary shackle padlock and lock housing combine to create a visual deterrent to robbery by being obviously difficult and time-consuming to open by force.

The secure enclosure is convenient for both persons with access to the secure compartment and other persons who deposit items into the unlocked portal. Persons depositing items, such as mail carriers, do not need a key or combination to drop items into the portal.

Unlocking the door to the secure compartment can be done with only one hand because the rotary shackle padlock does not need to be moved to unlock it. The rotary shackle padlock remains in the lock housing and the key remains in the keyway when the door is open, so the open lock does not have to be held while retrieving mail. The key can only be removed from the keyway when the rotary shackle padlock is locked, making it less likely that the door could be left unlocked accidentally.

The secure enclosure is constructed of strong materials such as hardened steel, such that it cannot be opened readily by a smashing with a baseball bat or sledge, or by cutting with a saw.

The secure enclosure is a convenient and secure dropbox that many persons can deposit items into without having a key or knowing a combination. The known, quick methods that thieves use against locked mailboxes and similar enclosures will not open the secure enclosure.

The invention will now be described in more particular detail with respect to the accompanying drawings in which like numerals refer to like parts throughout.

DETAILED DESCRIPTION OF THE INVENTION

Figure 1:
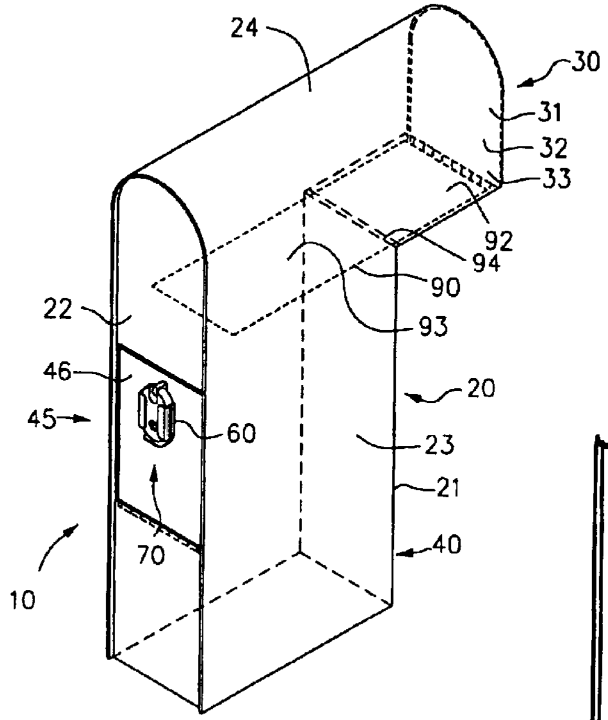
FIG. 1 is a rear left perspective view of a preferred embodiment of the secure enclosure of the present invention.
Figure 2:
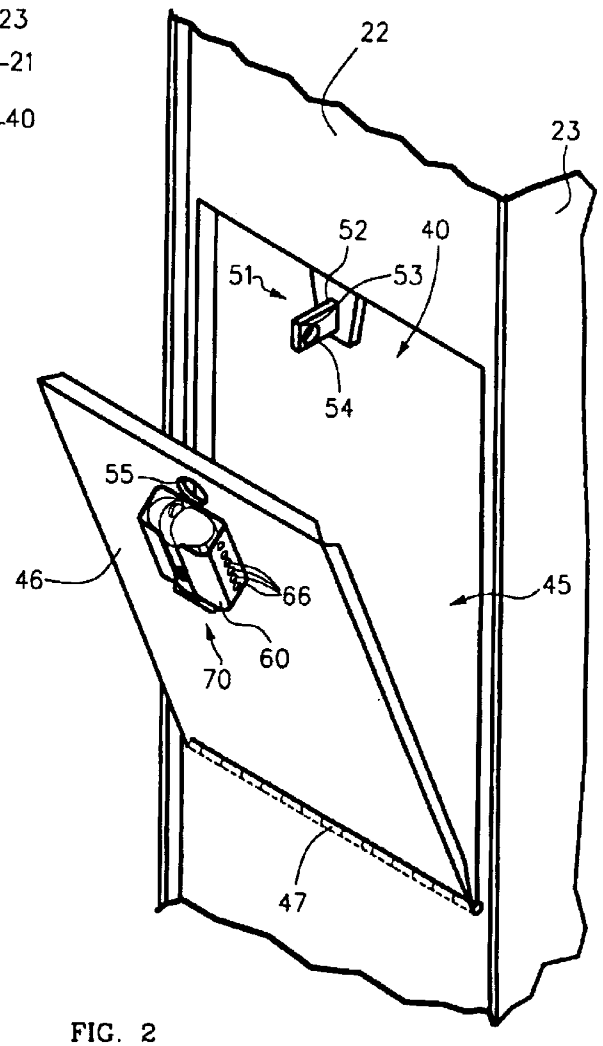
FIG. 2 is an enlarged perspective view, partly cut away, of the door of the secure enclosure of FIG. 1, with door partially open.

FIG. 1 is a rear left perspective view of secure enclosure 10 of the present invention. FIG. 2 is an enlarged perspective view, partly cut away, of the rear wall 22 and door 46 of secure enclosure 10 with door 46 partially open.

Secure enclosure 10 generally includes front wall 21 (shown in phantom), back wall 22, two side walls 23, and top 24, which are connected so as to enclose receiving compartment 30 and secured compartment 40. Receiving compartment 30 includes unsecured portal means 32, such as hatch 33, for conveniently inserting items to be stored into secure enclosure 10. Hatch 33 can be opened and used by anyone, without a key. Secured compartment 40 includes securable access means 45, such as door 46, and requires a key to open.

Door 46 is illustrated in FIG. 1 and is herein described as being located on back wall 22, although door 46 may alternatively be located on front wall 21 or either of side walls 23. Door 46 is preferably attached to back wall 22 by hinge 47 and opens downwardly. The weight of rotary shackle padlock 70 holds door 46 fully downward, allowing the use of both hands to get mail out of secure compartment 40. Door 46 may alternatively open upwardly, but in that case, door 46 must be supported in the open position, such as with a hand. Door 46 may alternatively open to one side, but a strong wind may tend to blow door 46 shut, also required door 46 to be held open.

Hasp 51 cooperates with rotary shackle padlock 70 and lock housing 60 to securely lock door 46 in a closed position.

Figure 3:
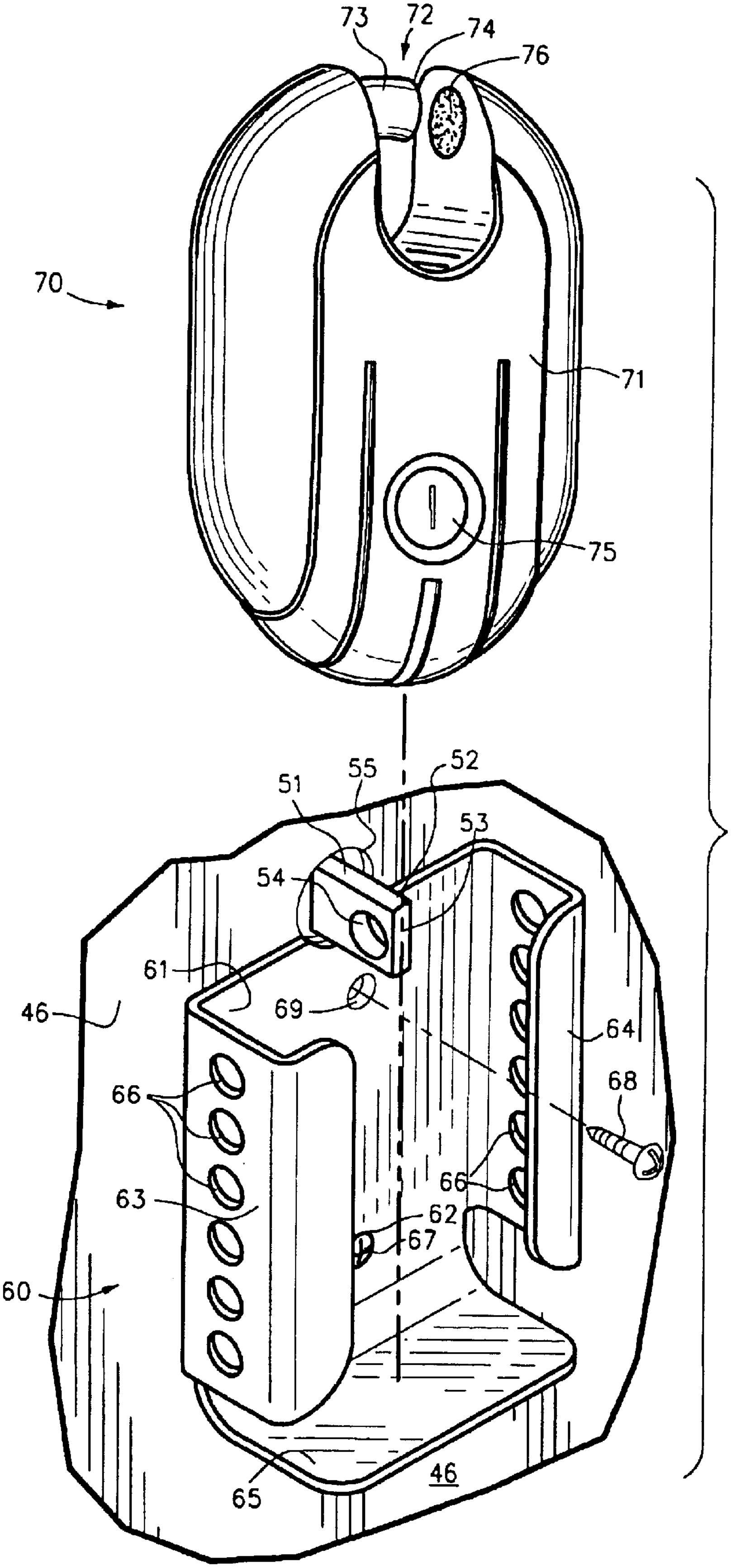
FIG. 3 is an enlarged perspective view, partly exploded and partly cut away, of the lock, housing, and door of the enclosure of FIG. 1.

FIG. 3 is an enlarged perspective view, partly exploded and partly cut away, of lock 70, lock housing 60, and door 46 of enclosure 10 of FIG. 1.

lock housing 60 both protects rotary shackle padlock 70 from tampering and attaches rotary shackle padlock 70 to back wall 22 lock housing 60 is preferably fabricated from a strong, tough material such as stainless steel lock housing 60 includes a back 61, a first side 63, second side 64, and bottom 65. Back 61 has a first screw hole 62 and a second screw hole 69 bored through it. First side 63 and second side 64 are spaced apart so as to accept rotary shackle padlock 70 with a tight friction fit. Bottom 65 supports rotary shackle padlock 70 and shields padlock 70 from being pried or twisted from below.

lock housing 60 is mounted onto door 46 by inserting first screw 67 through first screw hole 62. First screw 67 is countersunk and is flush with back 61 of lock housing 60 when installed, allowing rotary shackle padlock 70 to be pushed into lock housing 60. First side 63 and second side 64 fit snugly against the sides of rotary shackle padlock and curve over the front of rotary shackle padlock 70. First side 63 and second side 64 thus help shield body 71 of rotary shackle padlock 70 against cutting or drilling and prevent rotary shackle padlock 70 from moving laterally or outwardly with respect to door 46.

Second screw 68 is then inserted into second screw hole 69 and screwed down. Second screw 68 is not countersunk, and so protrudes from back 61 to function as a retainer for rotary padlock 70 by interfering against the apex of notch 72. Second screw 68 is tightened by passing a screwdriver through notch 72 to second screw 68. Thus, lock housing 60 holds rotary shackle padlock 70 tightly against movement to either side or downward. Second screw 62 prevents upward movement relative to lock housing 60. "Upward" as used in this specification and in the claims means in a direction away from bottom 65 of lock housing 60.

Rotary shackle padlock 70, a commercially available product, includes body 71; rotary shackle 73, which includes engaging end 74; engaging aperture 76; and rotary shackle drive means, such as keyway 75. Keyway 75 admits a key (not shown) that rotates the interior gears (not shown), which move rotary shackle 73. Rotary shackle 73 includes an engaging end 74 that moves across notch 72 in an arcuate manner when driven by the interior gears and engages into engaging aperture 76 to lock padlock 70.

An alternative rotary shackle drive means is the front dial (not shown) of a combination rotary shackle padlock (not shown). Other rotary shackle drive means will be obvious to those skilled in the art but are not described herein.

Rotary padlock 70 thus may be locked and unlocked without body 71 moving relative to hasp 51. This feature allows rotary padlock 70 to be tightly held within lock housing 60, unlike sliding shackle padlocks. Sliding shackle padlocks require movement of the body of the lock relative to the hasp in order to lock or unlock it and are, therefore, unsuitable for use as a part of secure enclosure 10.

Additional features of rotary padlock 60 are that keyway 75 is located on the front of rotary padlock 70 and that the key cannot be removed from keyway 75 when rotary padlock 70 is unlocked. Thus, rotary padlock 70 can be easily unlocked and locked by a person using only one hand, even when rotary padlock 70 is attached within lock housing 60. One-hand operation is especially convenient when locking secure enclosure 10 after retrieving items, such as mail. The mail may be held securely in one hand while locking secure enclosure 10 with the other hand.

A sliding shackle padlock typically requires a user to grasp the padlock with one hand and tilt it upward to make the keyway visible. A user inserts a key (or operates a combination dial) with the other hand, turns the key, and moves the body of the padlock vertically downward relative to the hasp means to disengage the shackle. Next, the body of the padlock is rotated and the shackle is removed from the hasp means. When a sliding shackle padlock is used to lock a mailbox, a user typically holds the padlock while retrieving mail from the mailbox. The key may be left in the keyway, but is subject to falling out. Because of the substantial movement and manipulation involved in unlocking and locking a sliding shackle padlock, such a lock cannot be rigidly attached to an enclosure Such as a mailbox and is inconvenient in use. Items held in the hand, Such as retrieved mail, are typically set on the ground or gripped in the teeth while operating the padlock.

Rotary shackle padlock 70 and hasp 51 cooperate to lock door 46. Hasp 51 includes tongue 52, a rod of strong material such as hardened steel, attached to back wall 22 and projecting outwardly. Free end 53 of tongue 52 protrudes through aperture 55 in door 46 when door 46 is closed, such that bore 54 is outside of enclosure 10. When the key is turned within keyway 75 to lock rotary shackle padlock 70, engaging end 74 of shackle 73 passes through bore 54 and then into engaging aperture 76 of rotary shackle padlock 70, preventing door 46 from being opened.

Bore 54 has an inner diameter only slightly greater than that of shackle 73, so hasp means 51 also serves to further reinforce rotary shackle padlock 70 against being pried or slammed.

Other types of hasp means 51 are well-known to those skilled in the art and will not be discussed further herein.

In the preferred embodiment 10 illustrated and described herein, lock housing 60 and rotary shackle padlock 70 are disposed on the exterior of enclosure 10 and tongue 52 is attached inside enclosure 10 and protruding outwardly. An advantage of mounting lock housing 60 and rotary shackle padlock 70 on the exterior is that they act as a visual deterrent to thieves, warning the thieves that the secure mailbox will be very difficult to open. Rotary shackle padlocks are known to be difficult to cut or punch and it would be readily apparent to most thieves, even those not familiar with the secure enclosure 10 of the present invention, that lock housing 60 and door 46 further protect rotary shackle padlock 70 against being, destroyed or opened by punching the working part of the lock out.

Sides 63 of lock lock housing 60 preferably include grip means 66 for helping a person grip lock lock housing 60, such as the plurality of holes shown in the drawings. Grip means 66 makes it easier for the user to use lock lock housing 60 as a handle for moving door 46.

In an alternative preferred embodiment, not illustrated, the relative positions are reversed, such that lock housing 60 and rotary shackle padlock are attached to the inner side of door 46 and engaging end 74 passes through a hasp means located inside enclosure 10. This embodiment requires that keyway 75 be accessible through a small key port cut through door 46, unless a rotary shackle padlock with keyless remote operation is employed. This alternative embodiment would be appropriate where visual deterrence is not required or where it is desirable to protect rotary shackle padlock 70 from vandalism damage, such as defacing with acid or epoxy adhesive.

Secure enclosure 10 of FIG. 1 is well-adapted for receiving and storing of mail. Enclosure 10 includes receiving compartment 30, including the familiar tunnel 31 that projects outwardly for the convenience of a postman in a vehicle, and a non-secured portal 32, such as hatch 33. Enclosure 10 further includes secured compartment 40 for storage of mail until it is retrieved. Mail is retrieved by using door 46 as described above. Door 46 is typically located on rear wall 45 so that access in not blocked by tunnel 31. Also, secure enclosure 10 may be placed such that tunnel 31 extends over or through a fence such that hatch 33 is available to a delivery person on the street but door 46 is within a fenced yard or court.

Baffle 90 is disposed between receiving compartment 30 and secured compartment 40. Baffle 90 is depicted as a pivoting platform, attached to front wall 21 or side walls 23 by pivot 94. Baffle 90 is balanced such that it is normally horizontal. A postman or other delivery person opens hatch 33 and deposits items onto receiving end 92 of baffle 90, then lifts receiving end 92 upward. The items slide to drop end 93 of baffle 90 and then into secured compartment 40. When receiving end 92 is in its normal horizontal position, baffle 90 extends nearly to back wall 22 and blocks access to secure compartment 40. When receiving end 92 is lifted, receiving end 92 blocks tunnel 31. Thus, baffle 90 prevents anyone from pulling items out of secured compartment 40 up to hatch 33. Hatch 33 does not need to be locked, making it convenient for any delivery person to deposit items without needing a key.

It will be obvious to those skilled in the art that other known types of mechanical baffles may be employed.

Secure enclosure 10 is also well-adapted for use as a law enforcement dropbox for depositing evidence, firearms, or other items that require secure handling. Modifications to the dimensions can be made to further adapt enclosure 10 for a specific use. For example, if enclosure 10 will be used to store especially heavy or breakable items, it would be desirable to lessen the impact of items falling into secure compartment 40, such as by adding an inclined platform inside secure compartment 40 to allow items to slide to the bottom of secure compartment 40 from baffle 90; by limiting the height of enclosure 10; by including a layer of shock-absorbing material such as synthetic viscoelastic foam in the bottom of secure compartment 40; or by other means well known to those skilled in the art. Because only persons authorized to remove items from secure enclosure 10 need to have the key to rotary padlock 70, keys are less likely to be lost, duplicated, or used in an unauthorized manner.

Although particular embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A secure enclosure enclosing a secure compartment for storing items; including:

a doorway for access to said secure compartment;

a hasp;

a door for covering said doorway, movable between an open position providing access to said secure compartment through said doorway and a closed position preventing access to said secure compartment through said doorway; including:

an inside surface facing said secure compartment; and an outside surface opposite said inside surface;

a lock housing attached to said door;

a rotary shackle padlock mounted rigidly within said lock housing; including:

a body;

a rotary shackle movable between a locked position and an unlocked position; and rotary shackle drive means for moving said rotary shackle between locked and unlocked positions;

said rotary shackle padlock mounted within said housing such that said rotary shackle engages said hasp to secure said door in the closed position; and such that said body of said rotary shackle padlock cannot move relative to said door; and such that said rotary shackle drive means is available for use.

2. The secure enclosure of claim 1; wherein said lock housing is attached to said outside surface of said door.

3. The secure enclosure of claim 2, said secure enclosure further including:

an aperture through said door; and said hasp including:

a tongue; including:

a free end protruding from said secure enclosure and through said aperture when said door is in its closed position; and a bore through said free end, adapted to receive said rotary shackle of said rotary shackle padlock.

4. The secure enclosure of claim 1, said lock housing including:

a back for contact with said door including:

two holes for passage of screws;

two sides connected to said back;

a bottom connected to said back for supporting said rotary shackle padlock and for preventing movement of said rotary shackle padlock downward relative to said door;

a first, countersunk, screw for attaching said lock housing to said door; and a second, non-countersunk, screw for retaining said rotary shackle padlock against upward movement relative to said lock housing and for attaching said lock housing to said door; wherein said sides of said lock housing are adapted for snugly holding said body of said rotary shackle padlock against lateral or outward movement relative to said door.

5. The secure enclosure of claim 4, said sides of said lock housing including:

grip means for improving a person's grip on said housing.

6. The secure enclosure of claim 1, said secure enclosure further including:

unsecured portal means for easily adding items to said secure compartment.

7. The secure enclosure of claim 6, said enclosure further including:

baffle means for preventing removal of items from said secure compartment through said unsecured portal means.

8. The secure enclosure of claim 6, said secure enclosure being adapted for receiving and storing mail.

9. The secure enclosure of claim 6, said secure enclosure being adapted for receiving, and storing items of evidence for a law enforcement agency.

10. The secure enclosure of claim 6, said secure enclosure being adapted for receiving, and storing keys and sets of keys attached to keyrings.

11. In combination:

an enclosure for storage of items; including:

a door movable between an open position and a closed position; including:

an exterior face; and an interior face; and a hasp;

a rotary shackle padlock; including:

a body;

a rotary shackle movable between a locked and an unlocked position; and rotary shackle drive means; and a lock housing attached to said door, said rotary shackle padlock mounted ridigly within said lock housing for rigidly attaching said rotary shackle padlock to said door such that said rotary shackle, in the locked position, engages said hasp to lock said door in the closed position; and such that said rotary shackle drive means is available when said door is locked; and such that said lock housing reinforces said body of said rotary shackle padlock.

12. The combination of claim 11, said lock housing including:

a back for contact with said door; including:

two holes for passage of screws;

two sides connected to said back;

a bottom connected to said back for supporting said rotary shackle padlock and for preventing movement of said rotary shackle padlock downward relative to said door;

a first countersunk screw for attaching said lock housing to said door; and a second non-countersunk screw for retaining said rotary shackle padlock against upward movement relative to said housing; wherein said sides of said lock housing are adapted for snugly holding said body of said rotary shackle padlock against lateral or outward movement relative to said door.

13. The combination of claim 12, said lock housing disposed on said exterior face of said door such that said lock housing and said rotary shackle padlock are readily visible when said door is in a closed position.

14. A secure mailbox; including:

an enclosure; including:

a front wall;

a back wall;

a pair of side walls; and a top; said front wall, said back wall, said pair of side walls, and said top connected together to enclose a receiving compartment; including:

a tunnel; including:

a hatch for depositing items into said receiving compartment; and a secure compartment; and secure access means providing access to said secure compartment; including:

a hasp;

a door, movable between an open position providing access to said secure compartment and a closed position preventing access to said secure compartment; including:

an inside surface facing said secure compartment; and an outside surface opposite said inside surface;

a rotary shackle padlock; including:

a body;

a rotary shackle movable between a locked position and an unlocked position; and rotary shackle drive means for moving said rotary shackle between locked and unlocked positions; and a lock housing attached to said door, said rotary shackle padlock mounted rigidly within said lock housing for rigidly attaching said rotary shackle padlock to said door such that said rotary shackle in the locked position engages said hasp to lock said door in the closed position, and such that said rotary shackle drive means is available when said door is locked, and such that said lock housing reinforces said body of said rotary shackle padlock.

15. The secure mailbox of claim 14, wherein said lock housing is attached to said outside surface of said door.

16. The secure mailbox of claim 14, said lock housing including:

a back for contact with said door; including:

two holes for passage of screws;

two sides connected to said back;

a bottom connected to said back for supporting said rotary shackle padlock and for preventing movement of said rotary shackle padlock downward relative to said door;

a first, countersunk, screw for attaching said lock housing to said door; and a second, non-countersunk, screw for retaining said rotary shackle padlock against upward movement relative to said lock housing and for attaching said lock housing to said door; wherein said sides of said lock housing are adapted for snugly holding said body of said rotary shackle padlock against lateral or outward movement relative to said door.

17. The secure mailbox of claim 14, said mailbox further including:

baffle means for preventing removal of items from said secure compartment through said hatch.

* * * * *